(12) United States Patent
Bordoni

(10) Patent No.: US 11,149,566 B2
(45) Date of Patent: Oct. 19, 2021

(54) GUIDE VANE FOR A TURBOMACHINE FAN

(71) Applicant: SAFRAN AIRCRAFT ENGINES, Paris (FR)

(72) Inventor: Nils Edouard Romain Bordoni, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/955,449

(22) PCT Filed: Dec. 17, 2018

(86) PCT No.: PCT/FR2018/053335
§ 371 (c)(1),
(2) Date: Jun. 18, 2020

(87) PCT Pub. No.: WO2019/122657
PCT Pub. Date: Jun. 27, 2019

(65) Prior Publication Data
US 2020/0347737 A1   Nov. 5, 2020

(30) Foreign Application Priority Data

Dec. 21, 2017 (FR) ...................... 1762890

(51) Int. Cl.
*F01D 5/18* (2006.01)
*F01D 9/04* (2006.01)

(52) U.S. Cl.
CPC .............. *F01D 9/041* (2013.01); *F01D 5/18* (2013.01); *F05D 2220/36* (2013.01); *F05D 2240/12* (2013.01); *F05D 2260/213* (2013.01)

(58) Field of Classification Search
CPC . F01D 9/041; F01D 5/18; F01D 5/187; F05D 2220/36; F05D 2240/12; F05D 2260/213
See application file for complete search history.

(56) References Cited

U.S. PATENT DOCUMENTS 3,394,918 A * 7/1968 Wiseman ................ F16H 41/28
                                                                416/241 R
8,500,392 B2 * 8/2013 Durocher .................. F01D 9/06
                                                                415/116

(Continued)

FOREIGN PATENT DOCUMENTS

EP   3 179 048 A1   6/2017
ER   2 383 437 A2   11/2011

(Continued)

OTHER PUBLICATIONS

International Search Report dated Apr. 11, 2019 in PCT/FR2018/053335 filed on Dec. 17, 2018, citing documents AA-AD and AO-AQ therein, 2 pages.

(Continued)

*Primary Examiner* — Woody A Lee, Jr.
*Assistant Examiner* — Brian Christopher Delrue
(74) *Attorney, Agent, or Firm* — Oblon, McClelland, Maier & Neustadt, L.L.P.

(57) ABSTRACT

A guide vane in an outer section of a turbofan engine contains oil cooling cavities which are located on one side of a main bending axis of the vane so that the differential thermal expansions compensate for the bending deformations caused by the aerodynamic forces exerted on the outer vane surface.

8 Claims, 3 Drawing Sheets

(56) References Cited

U.S. PATENT DOCUMENTS

| | | | | |
|---|---|---|---|---|
| 2005/0031451 | A1* | 2/2005 | Cunha | F01D 5/187 |
| | | | | 416/97 R |
| 2011/0268562 | A1* | 11/2011 | Knight, III | F01D 25/12 |
| | | | | 415/179 |
| 2014/0165570 | A1* | 6/2014 | Herring | F02C 7/14 |
| | | | | 60/730 |
| 2017/0159489 | A1* | 6/2017 | Sennoun | F02C 7/185 |
| 2017/0284417 | A1* | 10/2017 | Zaccardi | F02C 7/14 |

FOREIGN PATENT DOCUMENTS

| | | | | |
|---|---|---|---|---|
| GB | 2546422 A | * | 7/2017 | F02C 7/14 |
| WO | WO 02/38938 A1 | | 5/2002 | |
| WO | WO-2015191039 A1 | * | 12/2015 | F01D 9/04 |

OTHER PUBLICATIONS

French Preliminary Search Report dated Jul. 20, 2018 in French Application 1762890 filed on Dec. 21, 2017, citing documents AA, AC and AO-AQ therein, 1 page.

* cited by examiner

GUIDE VANE FOR A TURBOMACHINE FAN

The subject matter of the invention is a turbomachine guide vane, located in a fan guide section.

Some known turbomachines include a dual flow, and a brief description thereof will be given by means of FIG. 1. The rotor 1 is surrounded by a stator 2 including an internal casing 3, also referred to as hub, and an external casing 4, also referred to as ferrule, that are concentric. A primary stream 5 extends between the rotor 1 and the internal casing 3, and a secondary stream 6 between the internal casing 3 and the external casing 4. Compressors 7, 8, followed by turbines 9, 10 extend along the primary stream 5 upstream and downstream from a combustion chamber 11. The machine further comprises a fan 12 upstream from the streams 5 and 6, composed of rotary vanes the tops whereof extend up to the external casing 4, and opposite, a nozzle 13 where the streams 5 and 6 converge and the flows thereof join. The vanes of the fan 12 offer a first acceleration for the air entering the machine, in conjunction with a compression and a significant helical motion component. A guide section 14, composed of guide vanes (frequently referred to as OGVs or "Outlet Guide Vanes"), is added to rectify the flow in the external stream 6, i.e. to attenuate this helical flow component. The guide vanes extend in the external stream 6 and further comprise a radially internal end portion, such as a platform, connected to the internal casing 3, and a radially external opposite end portion, which also may be a platform, connected to the external casing 4. In some designs, the vanes of the guide section 14 have a structural role of providing the suspension of the internal casing 3 excluding if applicable any other structure.

A further possible function for the vanes of the guide section 14 is that of enabling heat exchange between the air of the external stream 6 and a heat transfer fluid such as the oil lubricating the machine, carried in a recycling circuit and subject to significant heating. For this, it is conveyed through the branches of the circuit that pass through some at least of the vanes of the guide section 14, since the external stream 6 remains a cold part of the machine, in the absence of gas combustion, and the compression of the gases by the fan 12 being moderated.

It is observed that the vanes of the guide section 14 are subjected to substantial stress by the pressure of the secondary flow and are subject to potentially significant bending. As shown in FIG. 2, incident air jets V reach the vanes 15 of the guide section 14 forming an angle therewith in the region of leading edges 17, before being rectified to form an outlet flow W substantially in the axial direction X of the machine, after sliding along intrados faces 19 and leaving the vanes 15 via trailing edges 18. The stress applied by the reaction of the air on the vanes 15 subsequently is expressed by bending forces. A division of the blade 15 into stacked sections will now be considered, each of which is at a height, or at a uniform, radial position, between the ends of the vane 15 connected to the internal casing 3 and to the external casing 4. These sections of the vane 15, perpendicular to a radial direction R perpendicular to the axial direction X, have quadratic moments of inertia (computed using the conventional formula $$I = \overset{S}{\Sigma} m \, r^2$$

where m is the mass of a point of the section S, and r the distance thereof to the axis passing through the section, about which the moment is calculated) which are used to define two principal axes of inertia, about which the quadratic moments are respectively maximum and minimum. The first of these principal axes is annotated Iy and corresponds to the axis about which the vane 15 has the greatest flexural rigidity, and the other is annotated Iz and corresponds to the axis about which the flexural rigidity thereof is the lowest. The vane 15 will therefore be bent at each of the sections thereof, particularly about the axis Iz via the component annotated Tz of the loads exerted on the section S, perpendicular to this axis Iz which will be considered in relation to the invention. The principal axis of inertia Iz typically forms a relatively small angle (20° to) 30° with the axial direction X of the machine and divides the section of the vane 15 into a central region 40, also limited by the central portion of an extrados face 16, and a complementary region, comprising the leading edge 17 and the trailing edge 18, and herein divided into two end regions 41 and 42, comprising these edges respectively.

The cumulative pressure loads on all the sections of the vanes 15 has the effect of deforming same by bending in the angular direction of the machine, and producing a rotation of the external casing 4 which has various drawbacks: bending and misalignment of the utilities passing via the vanes 15 or downstream therefrom, misalignment of the radial shaft (used for power transmission between the turbomachine per se and ancillary starter equipment, generators, etc.) with increased wear of the bearings and gear teeth, and, in the case of a suspension of the internal casing 3 by the vanes 15, a misalignment of the nacelle structures and possible locking of the thrust reversers.

A main aim of the invention was that of counteracting this rotation due to the helical component of the air flow from the fan 12 and the corresponding bending of the vanes 15 of the guide section 14.

The close prior art comprising WO 02/38938 A1, US 2014/165570 A1, EP 3 179 048 A1, and US 2017/284417 A1.

A first aspect of the invention is a guide vane for a turbomachine fan, comprising two opposite ends intended to be mounted on an internal casing and an external casing, concentric with the internal casing, of the turbomachine, the vane being hollow and traversed by a main heat transfer fluid circulation conduit extending, from a fluid inlet at a first of the vane ends, into at least a height portion of the vane, the vane being composed of stacked planar sections, each at a uniform position in a radial direction of the turbomachine and each composed of a central region and at least one end region on either side of a principal axis of flexural inertia of the section (and therefore belonging to the plane of the section), the end region including a leading edge and a trailing edge of the vane, characterised in that, in each vane section of the height portion of the vane, the main conduit extends merely in the central region, said principal axis of inertia being an axis about which the section has a quadratic moment of inertia and the vane has the lowest flexural rigidity.

The technical effect of the invention may be summarised as follows. The bending, applied in the vane between the internal radius thereof and the external radius thereof, deforms same by applying a contraction in the central region and an expansion in the end regions. The fluid passing through the vane cavity being hotter, it produces thermal expansions. By applying this expansion in the central region, the vane undergoes a differential thermal expansion which produces opposite bending to the bending produced by the aerodynamic loads, and therefore reduces or cancels the rotation of the external casing in relation to the internal casing.

This arrangement may be optionally adopted for the entire height of the vanes or for merely a portion of this height, for example at the location where the aerodynamic compression is greatest.

By reinforcing the vanes 15 in this way, it will be possible to lighten same by doing away with static reinforcements or increases in thickness that are otherwise essential.

If the vane is also traversed, in the main portion, by secondary fluid circulation conduits ensuring the return thereof to the lubrication circuit in the opposite direction to the main conduit, it is advantageous that the secondary conduits extend into the end regions. The heat transfer fluid transport has been previously cooled before entering the secondary conduits, and it is therefore at a lower average temperature than in the main conduit. Thanks to this arrangement, the returns of the fluid, cooled and therefore less suitable for contributing to the differential thermal expansion, remain away from the central region, which may be occupied more fully by the main conduit, more useful for the effect of the invention.

The central main conduit, and the secondary conduits, when they exist, may all be divided into parallel conduits without changing the nature of the invention. In complex embodiments, there may therefore be a network of conduits in the central region, providing more particularly the effect of the invention and optionally occupying the entire central region or most of the surface area thereof, and one or two networks of secondary conduits on one or both sides of the central network, optionally but not necessarily disposed in the end regions, without nesting the networks in one another, the principal axis of inertia separating same completely in particularly characteristic embodiments.

A further aspect of the invention is a turbomachine fan guide section, optionally dual-flow, comprising a stage of guide vanes according to the above. This guide section may be located immediately downstream from a fan.

Also, a preferred embodiment of the guide section is characterised by a fluid circulation direction inversion arrangement either in the main conduit, or in the lateral conduits.

The various aspects, features and advantages of the invention will now be described in more detail by means of the following figures, which represent some preferred, but merely illustrative, embodiments thereof:

FIG. 1, already described, represents a dual-flow turbomachine;

FIG. 2, also described, conveys the technical problem solved by the invention;

Figure 5:
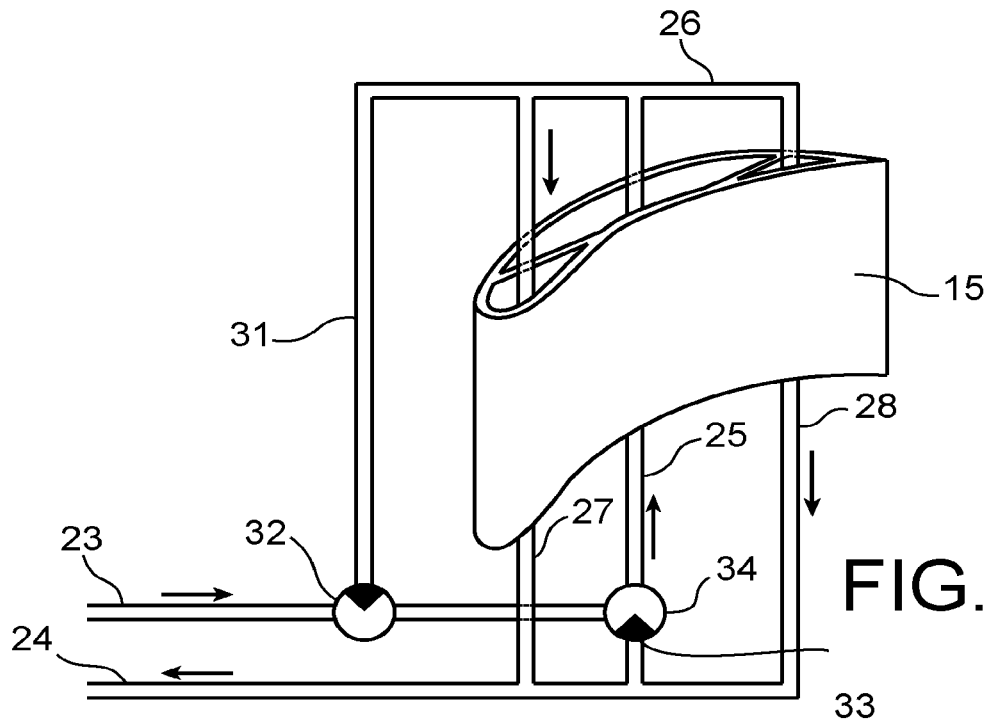
Figure 6:
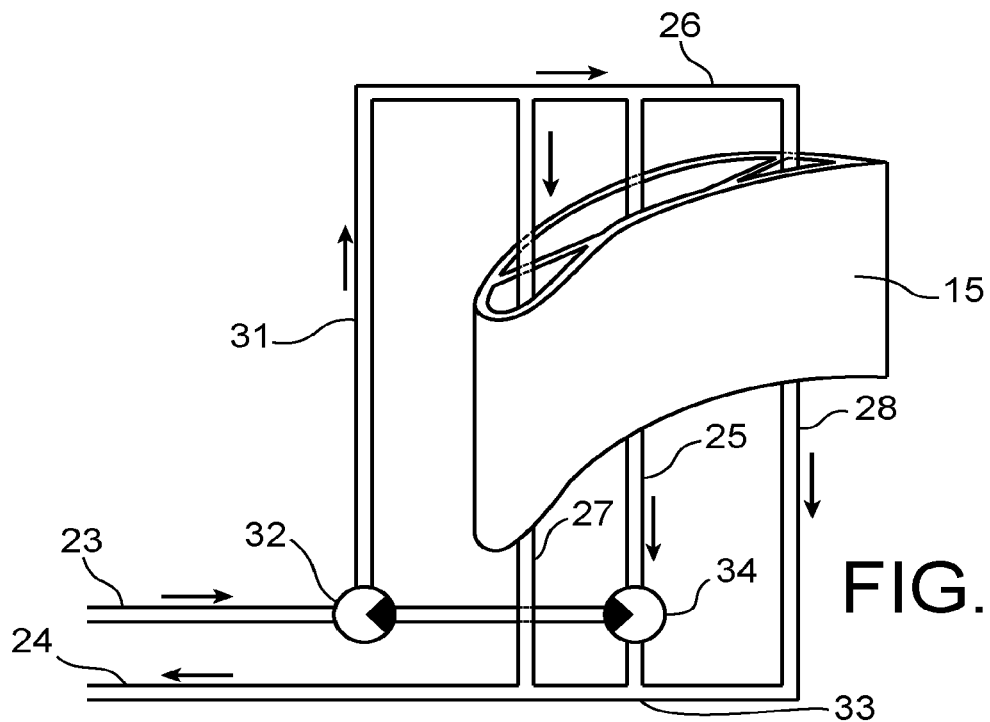

FIGS. 5 and 6 each represent a schematic illustration of an alternative embodiment.

Figure 1:
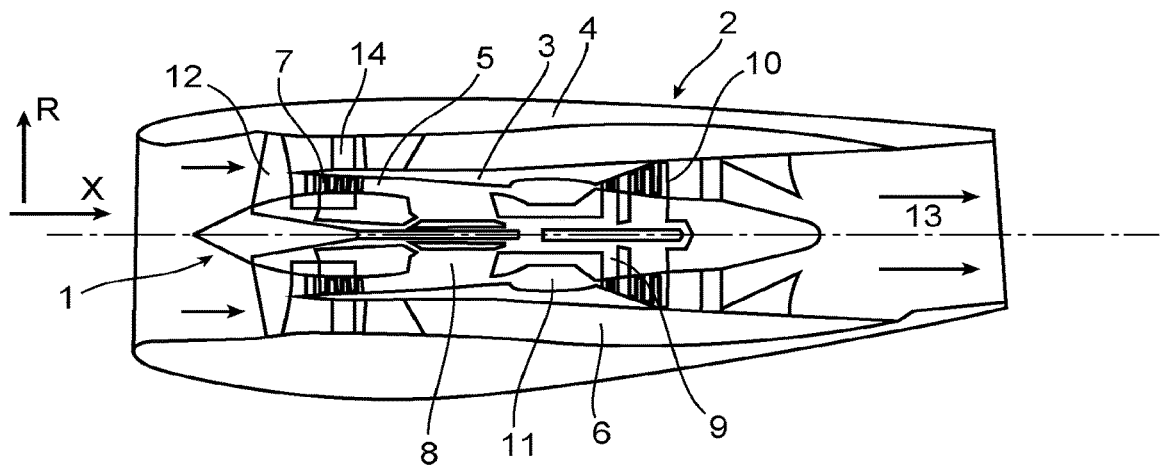
Figure 2:
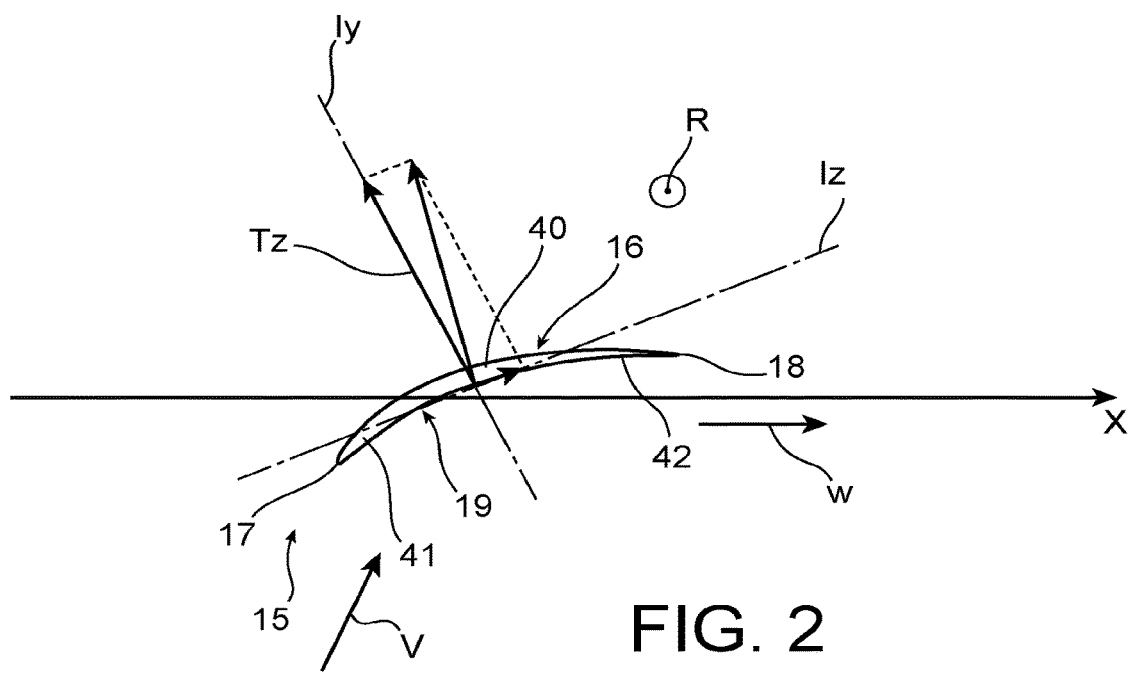
Figure 3:
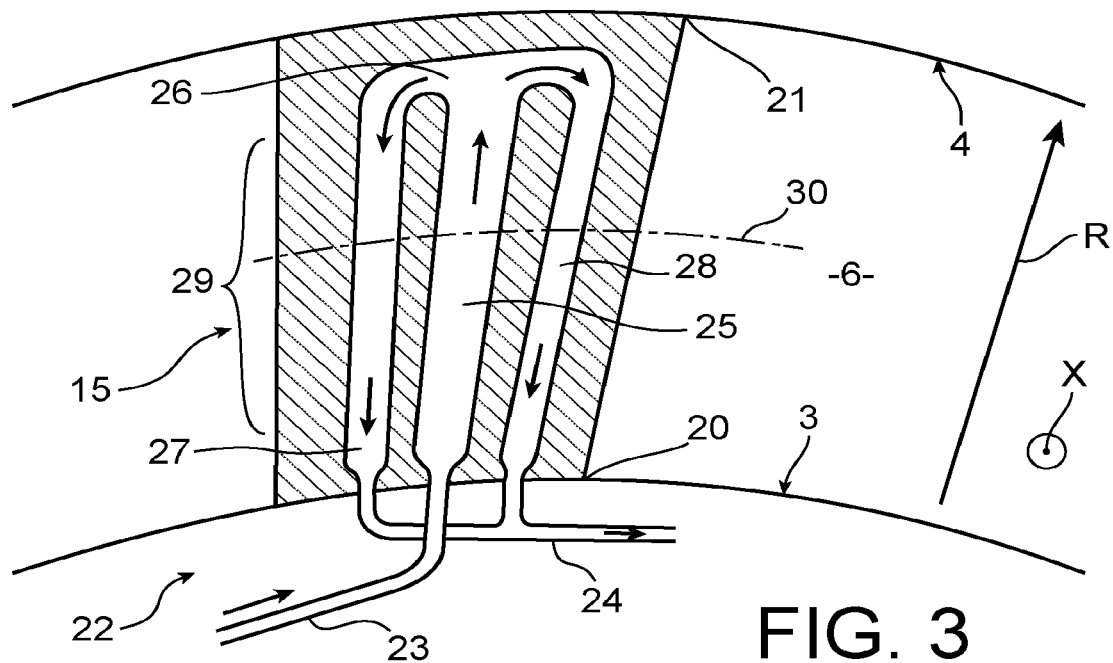
FIG. 3 represents a transverse cross-section of a vane according to the invention.
Figure 4:
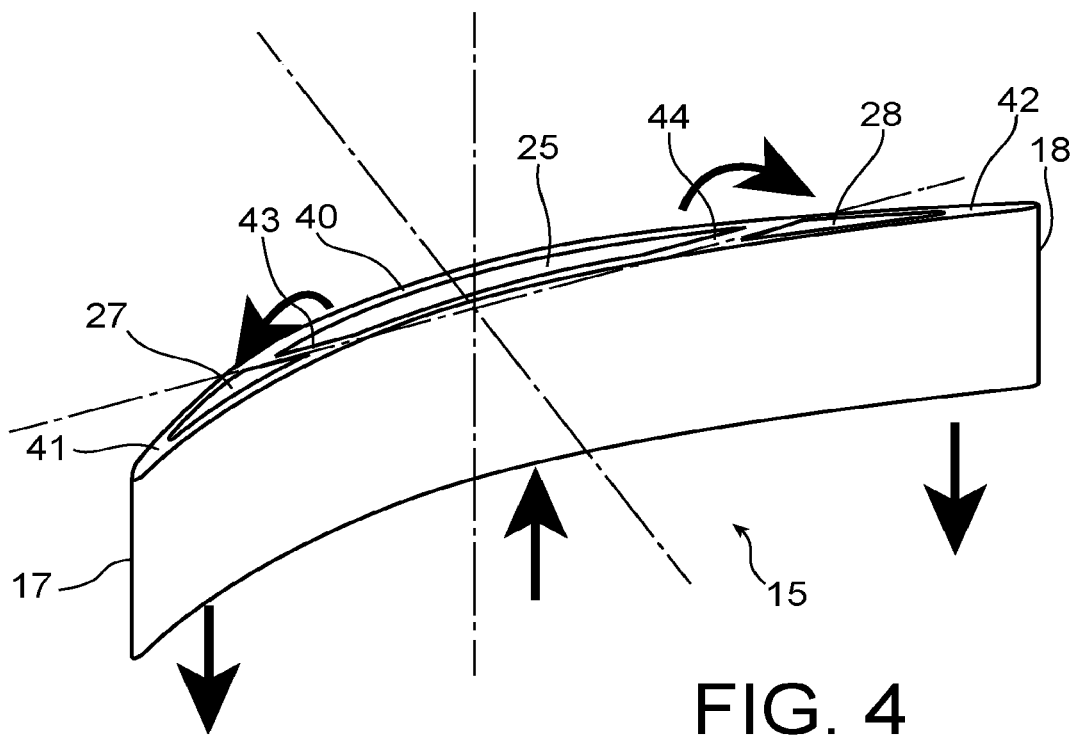
FIG. 4 represents a perspective view of the vane.

Reference is made directly to FIGS. 3 and 4. The vane 15 equipped with the invention includes an internal end 20 fastened to the internal casing 3, and an external end 21 fastened to the external casing 4. An oil lubrication circuit 22 is present in the machine, for example under the internal casing 3. It comprises a supply conduit 23 whereby the oil enters the vane 15 located downstream from a lubricated device where the oil has been exposed to friction and contact with hot solids (bearings for example); the oil is then hot, and suitable for transferring greater heat to the vane 15, and producing a greater local thermal expansion therein. The circuit further comprises an outlet circuit 24 whereby the oil comes out of the vane 15; the oil, which has then been cooled by passing in the vane 15, is less suitable for transferring heat, and produces smaller local thermal expansions. The supply conduit 23 is extended into the vane 15 via a cavity referred to as central conduit 25, wherein the oil rises in the radial direction R or height of the vane 15 before reaching a so-called upper coupling 26 (according to the orientation of FIG. 3, where "upper" is equivalent to "closer to the external casing 4") where the oil flow is dispersed before falling into lateral conduits 27 and 28, parallel with the central conduit 25 and the cooled oil travels in the opposite direction, towards the internal end 20, before joining the outlet conduit 24 which returns the oil to the lubricated device. The conduits 25, 27 and 28 extend over a height portion 29 of the vane 15 which may encompass the entire height or almost of the vane 15, and it is in any case advantageous that they extend via a main portion, encompassing the mid-height line 30 (at radial mid-distance from the casings 3 and 4) and optionally comprising about half the height of the vane 15 between said casings 3 and 4. The upper coupling 26 may be close to the external end 21, but this condition is not essential. In further possible embodiments of the invention, the lubrication circuit 22 could extend into the external casing 4, and the general arrangement of the conduits 25, 27 and 28 would then be inverted. In further possible embodiments, the lateral conduits 27 and 28 could be omitted, as well as the upper coupling 26, and the supply conduit 23 and the outlet conduit 24 would then both branch at opposite ends of the central conduit 25 extending into the internal casing 3 for one, into the external casing 4 for the other.

It is recommended, at least for the height portion 29 of the vane 15, that the central conduit 25 extend into the central region 40 and therefore between the central portion of the extrados face 16 and the principal axis of inertia Iz, so that the greatest thermal expansions produced by the heat transferred by the oil benefit the regions of the vane 15 subject to the greatest compression produced by the aerodynamic loads. The lateral conduits 27 and 28, being traversed by the oil already cooled, apply less substantial thermal expansions: it is therefore stated that these expansions are located at locations of the vane 15 which, being on average closer to the main axis Iz, or on the opposite side of this axis, are subject to less compression produced by aerodynamic bending or are subjected on the contrary to an extension. For this reason, it is advantageous that the lateral conduits 27 and 28 extend into the end regions 41 and 42. The principal axis of inertia Iz for which the quadratic moment of inertia of the section is minimal, and the strength of the vane 15 in respect of bending and at this section is also minimal, therefore perfectly separates the central conduit 25 from the lateral heat transfer fluid return conduits 27 and 28. Advantageously, the central conduit 25 occupies the greatest portion of the surface area of the central region 40; and the lateral conduits 27 and 28 may occupy the greatest portion of the surface areas of the respective end regions 41 and 42.

Relatively thin partitions of uniform thickness delimit the vane 15 and separate the conduits 25, 27 and 28. One of these partitions 43 separates the central conduit 25 from the lateral conduit 27 located around the leading edge 17, the other of these partitions 44 separates the central conduit 25 from the other lateral conduit 28, located around the trailing edge 18. The partitions 42 and 43 extend, in this embodiment, somewhat extending from one another and at the location of the principal axis Iz. This, the central conduit 25 extends exclusively in the side of the vane 15 subject to compression. In this embodiment, the lateral conduits 27 and 28 extend on the other side of the axis Iz. They could thus occupy a portion of the central region 40.

The various conduits 25, 27 and 28 could all be divided into several parallel conduits. In the embodiment shown, they are all rectilinear, which is not essential. The wall thicknesses of the vane 15 are identical on the extrados 16 side and the intrados 19 side for the various conduits 25, 26 and 27, which is likewise not essential, and the central conduit 25 could for example be closer to the extrados 16.

It is seen that the technical effect of the invention is produced above all by the central conduit 25, the lateral conduits 27 and 28 not being essential (or suitable for being left empty of oil). A slightly more complex arrangement, represented in FIGS. 5 and 6, may then be proposed, to produce a different operating mode as desired, wherein the differential thermal expansion is not used. With reference to FIGS. 5 and 6, the preceding oil circuit is supplemented by a by-pass 31, connecting to the upper coupling 26 one of the supply 23 and outlet conduits 24 by a first valve 32; a lower coupling 33 between the conduits 25, 27 and 28, at the opposite end to the upper coupling 26 is added; and a second valve 34, fitted on the same supply 23 or outlet conduit 24 as the first valve 32, is disposed at the junction of the conduit extending into the vane 15 (herein the central conduit 25) of the lower coupling 33. Herein also, "upper" and "lower" refer to the orientation of FIGS. 3, 5 and 6, and are equivalent to "closer to the external casing 4" and "closer to the internal casing 3", respectively.

As shown in FIG. 5, the first valve 32 closes the by-pass 31 and the second valve 34 closes the communication between the central conduit 25 and the lower coupling 33: the operation is the same as above, with reverse oil circulations between the central conduit 25 and the lateral conduits 27 and 28, the valves 32 and 34 enabling circulation from the supply conduit 23 to the central conduit 25. However, as shown in FIG. 6 where the two valves 32 and 34 are switched, the hot oil is sent into the by-pass 31, then into the upper coupling 26, before flowing in the same direction, towards the bottom of the figure, in the three conduits 25, 27 and 28. The second valve 34 then enables communication between the central conduit 25 and the lower coupling 33, which enables the oil having traversed the central conduit 25 to reach the outlet conduit 24 directly.

The invention has been described in relation to an oil lubrication circuit. It could be implemented with other heat transfer fluids, without changing the shape of the vane 15, which would offer the same heat exchange relationship.

The invention claimed is:

1. A guide vane for a turbomachine fan, comprising two opposite ends intended to be mounted on an internal casing and an external casing, concentric with the internal casing, of the turbomachine, the vane being hollow and traversed by a main heat transfer fluid circulation conduit extending, from a fluid inlet at a first of the vane ends, into at least a height portion of the vane, the vane being composed of sections, each at a uniform position in a radial direction of the turbomachine, the sections being each composed of a central region and at least one end region on either side of a principal axis of flexural inertia of the section, the end region including a leading edge and a trailing edge of the vane, wherein, in each vane section of the height portion of the vane, the main conduit extends merely in the central region, said principal axis of flexural inertia being an axis about which the section has a quadratic moment of inertia and the vane has the lowest flexural rigidity.

2. The guide vane according to claim 1, wherein the vane is also traversed, in the height portion of the vane, by lateral fluid circulation conduits between the main conduit and, respectively, the leading edge and the trailing edge of the vane, the lateral conduits extending between a fluid outlet and a first coupling, joining the ends of the lateral conduits to an end of the main conduit.

3. The guide vane according to claim 2, wherein the lateral conduits extend, in each section of the height portion of the vane, into said end region.

4. A guide section for a turbomachine fan, comprising a stage composed of vanes according to claim 1.

5. The guide section for a turbomachine fan, comprising a stage composed of vanes according to claim 2.

6. The guide section according to claim 5, comprising an oil circulation direction inversion arrangement either in the main conduit, or in the lateral conduits.

7. A turbomachine, comprising a secondary stream and at least one guide vane according to claim 1.

8. A turbomachine, comprising a fan and the guide section according to claim 5, immediately downstream from the fan.

\* \* \* \* \*